United States Patent
Asai

(10) Patent No.: US 10,138,876 B2
(45) Date of Patent: Nov. 27, 2018

(54) ACTUATOR AND ACTUATOR SET

(71) Applicant: Panasonic Intellectual Property Management Co., Ltd., Osaka (JP)

(72) Inventor: Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 217 days.

(21) Appl. No.: 15/366,106

(22) Filed: Dec. 1, 2016

(65) Prior Publication Data
US 2017/0175719 A1    Jun. 22, 2017

(30) Foreign Application Priority Data

Dec. 18, 2015  (JP) .................................. 2015-248015

(51) Int. Cl.
*F03G 7/06*        (2006.01)

(52) U.S. Cl.
CPC .................... *F03G 7/065* (2013.01)

(58) Field of Classification Search
CPC .................... F03G 7/065; F03G 7/06
See application file for complete search history.

(56) References Cited

U.S. PATENT DOCUMENTS

| 4,811,564 A * | 3/1989 | Palmer .................... F03G 7/065 60/527 |
| 2012/0239183 A1* | 9/2012 | Mankame ............... F03G 7/065 700/213 |
| 2013/0011806 A1* | 1/2013 | Gao ........................ F03G 7/065 432/37 |
| 2013/0096586 A1 | 4/2013 | Tozzi et al. |

FOREIGN PATENT DOCUMENTS

| JP | 6-013975 U | 2/1994 |
| WO | 2014/022667 | 2/2014 |

OTHER PUBLICATIONS

Carter S. Haines et al., "Artificial Muscles from Fishing Line and Sewing Thread", Science, vol. 343, pp. 868-872, Feb. 21, 2014.

\* cited by examiner

*Primary Examiner* — Mark Laurenzi
*Assistant Examiner* — Xiaoting Hu
(74) *Attorney, Agent, or Firm* — Wenderoth, Lind & Ponack, L.L.P.

(57) ABSTRACT

An actuator includes a first actuator fiber and a second actuator fiber that are connected to plate members, a frame member provided at a fixed distance from the plate member; and a controller that controls temperature of the first actuator fiber and temperature of the second actuator fiber. Each of the first actuator fiber and the second actuator fiber is wound spirally and stretches or contracts when temperature thereof is changed. Stretch or contraction of the first actuator fiber or the second actuator fiber based on the control of the temperature causes the plate member to be locked to the frame member or to be unlocked from the frame member.

11 Claims, 12 Drawing Sheets

ACTUATOR AND ACTUATOR SET

BACKGROUND

1. Technical Field

The present disclosure relates to an actuator and an actuator set that stretch or contract in accordance with a change in temperature.

2. Description of the Related Art

In accordance with increasing demands for a machine (e.g., household robot) that works close to a human, there are increasing expectations for an artificial muscle actuator having features such as a light weight and flexibility like human muscles. There are various kinds of artificial muscle actuators. Most of the artificial muscle actuators utilize deformation of a high polymer material that is suitable for the features such as a light-weight and flexibility.

An actuator having a structure in which a twisted high polymer fiber bundle is wound in a coil is known as one of the actuators that utilize deformation of a high polymer material (see, for example, International Publication No. 2014/022667 and Carter S. Haines et al. "Artificial Muscles from Fishing Line and Sewing Thread", SCIENCE, VOL. 343, pp. 868-872, 21 Feb. 2014). This actuator is a fibrous actuator that stretches and contracts in accordance with a change in temperature of the high polymer fiber bundle that is a plurality of twisted high polymer fibers. As the temperature of the high polymer fiber bundle rises, the twisted high polymer fibers are untwisted, and as a result, the entire length of the coil-like fibers contracts or stretches. As the temperature of the high polymer fiber bundle drops, the high polymer fibers are twisted again, and as a result, the entire length of the coil-like fibers stretches or contracts conversely. Whether the entire length of the coil-like fibers contracts or stretches when the temperature rises is determined on the basis of whether or not a direction of twisting of the high polymer fiber bundle is the same as a direction of winding of the coil. In a case where the direction of twisting of the high polymer fiber bundle is the same as the direction of winding of the coil, the entire length of the actuator contracts in accordance with a rise in temperature and stretches in accordance with a drop in temperature.

However, according to the conventional actuator, the temperature of the actuator need be kept constant in order to maintain a displaced state obtained by driving. This produces a problem that it is necessary to keep consuming energy in order to maintain the temperature although no work is done to the outside.

SUMMARY

The present disclosure provides an actuator and the like that can make energy consumption low.

In one general aspect, the techniques disclosed here feature an actuator including: one or more first actuator fibers that are connected to a first plate and a second plate via a connection member; one or more second actuator fibers that are connected to the first plate and the second plate via a connection member; a locking unit that is provided at a fixed distance from the first plate; and a controller that controls temperature of the one or more first actuator fibers and temperature of the one or more second actuator fibers, wherein each of the one or more first actuator fibers and the one or more second actuator fibers is wound spirally and stretches or contracts when temperature thereof is changed, and wherein the control of the temperature causes the second plate to be locked to the locking unit by controlling a difference in temperature between the one or more first actuator fibers and the one or more second actuator fibers in response to a locking command and causes the second plate to be unlocked from the locking unit by controlling the difference in temperature between the one or more first actuator fibers and the one or more second actuator fibers in response to an unlocking command.

An actuator and an actuator set according to the present disclosure can make energy consumption low.

It should be noted that general or specific embodiments may be implemented as a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3(a) is a diagram illustrating a locked state in which the second plate is locked, and FIG. 3(b) is a diagram illustrating an unlocked state in which the second plate is unlocked;

FIG. 6(a) is a diagram illustrating an unlocked state in which the second plate is unlocked, and FIG. 6(b) is a diagram illustrating a locked state in which the second plate is locked;

DETAILED DESCRIPTION

Figure 1:
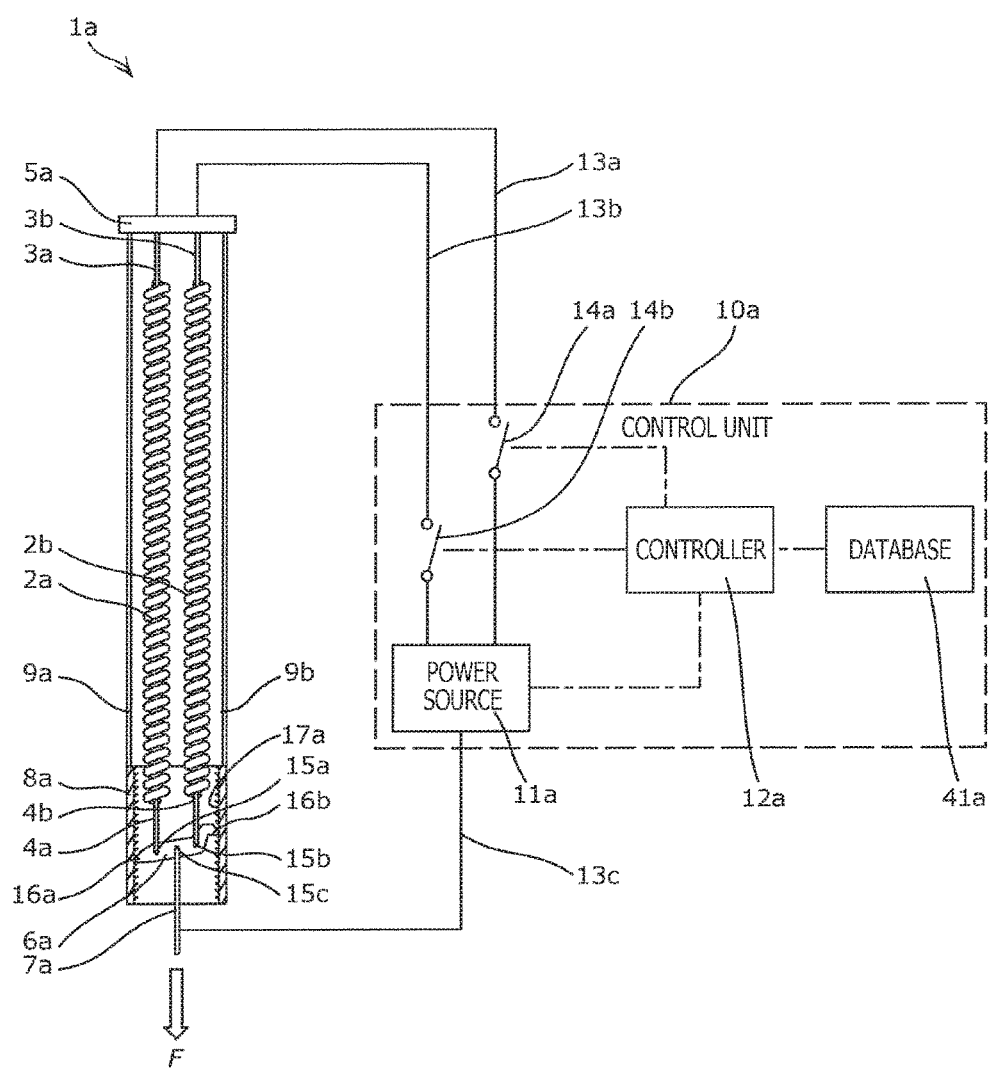
FIG. 1 is a diagram illustrating an outline of an actuator according to Embodiment 1.

In order to solve the problem of the actuator described in BACKGROUND, an actuator according to one aspect of the present disclosure includes: one or more first actuator fibers that are connected to a first plate and a second plate via a connection member; one or more second actuator fibers that are connected to the first plate and the second plate via a connection member; a locking unit that is provided at a fixed distance from the first plate; and a controller that controls temperature of the one or more first actuator fibers and temperature of the one or more second actuator fibers, wherein each of the one or more first actuator fibers and the one or more second actuator fibers is wound spirally and stretches or contracts when temperature thereof is changed, and wherein the control of the temperature causes the second plate to be locked to the locking unit by controlling a difference in temperature between the one or more first actuator fibers and the one or more second actuator fibers in response to a locking command and causes the second plate to be unlocked from the locking unit by controlling the difference in temperature between the one or more first actuator fibers and the one or more second actuator fibers in response to an unlocking command.

According to the arrangement, the second plate can be locked in a case where the first actuator fibers and the second actuator fibers are stretched or contracted. It is therefore possible to keep consumption of energy input to the actuator low.

The actuator may be, for example, arranged such that each of the one or more first actuator fibers and the one or more second actuator fibers has a structure in which a high polymer fiber bundle including one or more twisted high polymer fibers is wound spirally.

According to the arrangement, the first actuator fibers and the second actuator fibers are displaced by a large amount in response to a change in temperature.

The actuator may be, for example, arranged such that each of the one or more first actuator fibers and the one or more second actuator fibers has a structure in which a fibrous shape-memory alloy is wound spirally.

According to the arrangement, the first actuator fibers and the second actuator fibers are displaced by a large amount in response to a change in temperature.

The actuator may be, for example, arranged such that the control of the temperature causes the temperature of the one or more first actuator fibers and the temperature of the one or more second actuator fibers to be equal to each other in response to the locking command and produces a predetermined difference in temperature between the one or more first actuator fibers and the one or more second actuator fibers in response to the unlocking command.

According to the arrangement, the second plate can be locked or unlocked by simple operation. It is therefore possible to keep consumption of energy input to the actuator low.

The actuator may be, for example, arranged such that the control of the temperature causes the temperature of the one or more first actuator fibers and the temperature of the one or more second actuator fibers to be equal to each other after producing a difference in temperature between the one or more first actuator fibers and the one or more second actuator fibers in response to the locking command and increases the temperature of the one or more first actuator fibers and the temperature of the one or more second actuator fibers while keeping the temperature of the one or more first actuator fibers and the temperature of the one or more second actuator fibers equal to each other in response to the unlocking command.

According to the arrangement, the second plate can be locked or unlocked by simple operation. It is therefore possible to keep consumption of energy input to the actuator low.

The actuator may be, for example, arranged such that a spring rate of each of the one or more first actuator fibers is equal to a spring rate of each of the one or more second actuator fibers.

According to the arrangement, it is possible to suppress a change in posture of the second plate even in a case where external force that acts on the second plate is changed. This makes it possible to stably operate the actuator.

The actuator may be, for example, arranged such that a guide member that guides movement of the second plate when the second plate is locked or unlocked is provided on the locking unit.

According to the arrangement, the actuator can be stably locked or unlocked.

The actuator may be, for example, arranged such that the controller returns the temperature of the one or more first actuator fibers and the temperature of the one or more second actuator fibers to a room temperature in a state where the temperature of the one or more first actuator fibers and the temperature of the one or more second actuator fibers have been increased and the second plate has been locked.

According to the arrangement, a locked state of the second plate can be maintained even in a case where the temperature of the first actuator fiber and the temperature of the second actuator fiber are returned to a room temperature. It is therefore possible to keep consumption of energy input to the actuator low.

An actuator set including a plurality of aforementioned actuators disposed in parallel with each other may be provided.

According to the arrangement, external force is held by the plurality of actuator disposed in parallel with each other. This makes it possible to make the first actuator fiber and the second actuator fiber thin. It is therefore possible to provide a thin actuator set.

For example, an actuator set including a plurality of aforementioned actuators disposed in series with each other may be provided.

According to the arrangement, the entire length of the actuator set in the locked state can be adjusted by switching an actuator that is in the locked state among the plurality of actuators. Furthermore, it is possible to provide an actuator set whose elasticity in the locked state is adjustable.

Actuators and actuator sets according to embodiments are described below with reference to the drawings.

Each of the embodiments described below illustrates a general or specific example. Numerical values, shapes, materials, constituent elements, the way in which the constituent elements are disposed and connected, and the like are examples and do not limit the present disclosure. Among constituent elements described in the embodiments below, a constituent element that is not described in an independent claim indicating an uppermost concept is described as an optional constituent element. In the embodiments below, the expression "connected" encompasses direct connection and indirect connection using another member or the like. Furthermore, the expression "fixed" encompasses direct fixation and indirect fixation using another member or the like.

Embodiment 1

Configuration of Actuator

FIG. 1 is a diagram illustrating an outline of an actuator 1a according to Embodiment 1. The actuator 1a includes a single first actuator fiber 2a and a single second actuator fiber 2b. The first actuator fiber 2a and the second actuator fiber 2b are located between a plate member 5a, which is an example of a first plate, and a plate member 6a, which is an example of a second plate. A frame member 8a, which is an example of a locking unit, is provided around a side face of the plate member 6a.

Plate-like members like the ones illustrated in FIG. 1 are desirable as the first plate and the second plate since such plate-like members can be made thin, but the present embodiment is not limited to this. The first plate and the second plate can have any shape as long as similar operation and effect can be obtained.

Each of the first actuator fiber 2a and the second actuator fiber 2b has a coil-like structure in which a high polymer fiber bundle including one or more twisted high polymer fibers (nylon fibers) is wound spirally. Surfaces of the first actuator fiber 2a and the second actuator fiber 2b are silver-plated. The first actuator fiber 2a and the second actuator fiber 2b are resistively heated (electrically heated) upon application of electricity and stretch and contract in accordance with a change in temperature caused by the electric heating. In the present embodiment, a direction of twisting of the high polymer fiber bundle and a direction of winding of the spiral are the same as each other, and the first actuator fiber 2a or the second actuator fiber 2b contracts upon application of heat to the first actuator fiber 2a or the second actuator fiber 2b. Note that a configuration of each of the first actuator fiber 2a and the second actuator fiber 2b will be described later in detail.

The first actuator fiber 2a and the second actuator fiber 2b have the same spring shape and the same length and have an equal spring rate. Note that the expression "the same spring shape" means that the first actuator fiber 2a and the second actuator fiber 2b are the same as each other in terms of coil diameter, spring pitch, and wire diameter of a high polymer fiber bundle that will be described later.

Note that the number of first actuator fibers 2a and the number of second actuator fibers 2b are not limited to 1, and a plurality of first actuator fibers 2a and a plurality of second actuator fibers 2b may be provided between the plate member 5a and the plate member 6a. In this case, a spring rate of each of the plurality of first actuator fibers 2a is equal to that of each of the plurality of second actuator fibers 2b.

One ends of the first actuator fiber 2a and the second actuator fiber 2b are connected to the plate member 5a via connection members 3a and 3b, respectively. The other ends of the first actuator fiber 2a and the second actuator fiber 2b are connected to the plate member 6a via connection members 4a and 4b, respectively.

Each of the connection members 3a and 3b and the connection members 4a and 4b is, for example, made of a linear material. According to this configuration, the actuator 1a can be given flexibility against bending. The material can be high polymer fibers, carbon fibers, a metal wire, or the like. The high polymer fibers and the carbon fibers are light in weight and are therefore desirable. The metal wire is more desirably a material, such as a superelastic alloy, having flexibility against bending.

The plate member 6a has a supporting point 15a connected to the connection member 4a, a supporting point 15b connected to the connection member 4b, and a supporting point 15c connected to a linear member 7a. The plate member 6a is rotatably connected to the connection members 4a and 4b at the supporting points 15a and 15b. The linear member 7a is rotatably connected to the plate member 6a at the supporting point 15c. Load acts on the linear member 7a in the downward direction of FIG. 1. The supporting points 15a, 15b, and 15c are on a straight line so that the supporting point 15c is disposed between the supporting points 15a and 15b, and a space between the supporting point 15a and the supporting point 15c is equal to that between the supporting point 15b and the supporting point 15c.

The frame member 8a having a cylindrical shape is provided around a side face of the plate member 6a. The frame member 8a is disposed so that a side surface thereof is located outside the plate member 6a in a direction perpendicular to a direction in which the first actuator fiber 2a extends. The frame member 8a is fixed to the plate member 5a with linear joining members 9a and 9b interposed therebetween so that a predetermined distance is secured between the frame member 8a and the plate member 5a. Note that the frame member 8a is not limited to the one having a cylindrical shape and may be made up of two opposing plates and a plurality of support pillars sandwiched between the two opposing plates.

The joining members 9a and 9b can be made of high polymer fibers, carbon fibers, a metal wire, or the like. The high polymer fibers and the carbon fibers are light in weight and are therefore desirable. The metal wire is more desirably a material, such as a superelastic alloy, having flexibility against bending.

The frame member 8a has a hollow structure having a quadrangular cross section, and teeth 17a are provided on an inner side surface of the frame member 8a. Pawls 16a and 16b are provided at both ends of the plate member 6a, and the pawls 16a and 16b and the teeth 17a are engaged with each other when the posture of the plate member 6a approaches a horizontal state. When the pawls 16a and 16b and the teeth 17a are engaged with each other, the position of the plate member 6a displaced by driving can be maintained.

The actuator 1a is driven by a control unit 10a. The control unit 10a includes a power source 11a, a controller 12a, and switches 14a and 14b. The controller 12a switches a connection state between a wire 13a and the power source 11a by switching on and off the switch 14a and thus controls electricity application to the first actuator fiber 2a. The controller 12a switches a connection state between a wire 13b and the power source 11a by switching on and off the switch 14b and thus controls electricity application to the second actuator fiber 2b. The wire 13a is electrically connected to the first actuator fiber 2a via the plate member 5a and the connection member 3a. Similarly, the wire 13b is electrically connected to the second actuator fiber 2b via the plate member 5a and the connection member 3b. The plate member 5a is configured such that the wires 13a and 13b are not electrically conductive with each other.

In a case where the connection members 3a and 3b are made of an electrically conductive material, the connection members 3a and 3b can be used as wires as they are. In a case where the connection members 3a and 3b are made of a material that is not electrically conductive, electrical connection between the wire 13a and the first actuator fiber 2a and electrical connection between the wire 13b and the second actuator fiber 2b may be secured, for example, by metal-plating surfaces of the connection members 3a and 3b or forming an electrically conductive material on the surfaces. In the present embodiment, the power source 11a is electrically connected to each of the first actuator fiber 2a and the second actuator fiber 2b via the plate member 5a and the connection members 3a and 3b. However, the present embodiment is not limited to this. The wire 13a and the first actuator fiber 2a or the wire 13b and the second actuator fiber 2b may be directly connected to each other.

Furthermore, a wire 13c is connected to the power source 11a. The wire 13c is connected to the linear member 7a. The wire 13c is electrically connected to the first actuator fiber 2a and the second actuator fiber 2b via the linear member 7a, the supporting point 15c, the plate member 6a, the supporting points 15a and 15b, and the connection members 4a and 4b. In the present embodiment, each of the linear member 7a, the supporting point 15c, the plate member 6a, the supporting points 15a and 15b, and the connection members 4a and 4b is electrically conductive. However, the present embodiment is not limited to this. The wire 13c and the first actuator fiber 2a or the wire 13c and the second actuator fiber 2b may be directly connected to each other.

The temperature of the first actuator fiber 2a is adjusted by electric heating based on an ON/OFF operation of the switch 14a. The temperature of the second actuator fiber 2b is adjusted by electric heating based on an ON/OFF operation of the switch 14b. The temperature may be adjusted by adjusting a voltage or an electric current that is applied to the first actuator fiber 2a or the second actuator fiber 2b by the power source 11a or may be adjusted by adjusting periods in which the switches 14a and 14b are switched ON and OFF by the controller 12a, for example, like PWM driving. When the same amount of energy is input to the first actuator fiber 2a and the second actuator fiber 2b by the control unit 10a, the temperature of the first actuator fiber 2a and the temperature of the second actuator fiber 2b can be made equal to each other. Meanwhile, when different amounts of energy are input to the first actuator fiber 2a and the second actuator fiber 2b, the temperature of the first actuator fiber 2a and the temperature of the second actuator fiber 2b can be made different from each other.

In the actuator 1a according to the present embodiment, the length of the first actuator fiber 2a and the length of the second actuator fiber 2b can be changed by adjusting the temperature of the first actuator fiber 2a and the temperature of the second actuator fiber 2b, respectively. By changing the lengths and thereby changing tilt of the plate member 6a, the pawls 16a and 16b and the teeth 17a can be engaged or disengaged.

Configuration of Actuator Fiber

Figure 8:
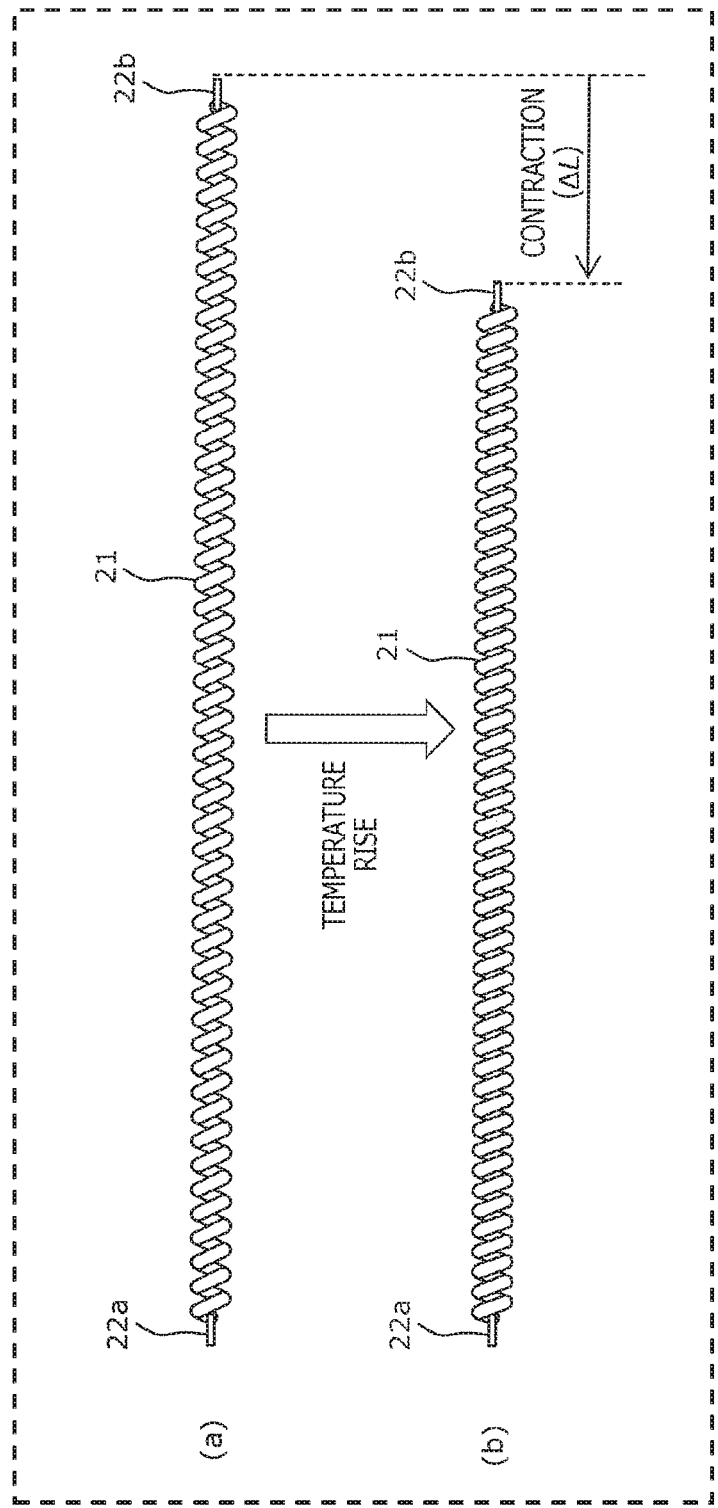
FIG. 8 is a diagram illustrating an outline of an actuator fiber.

Next, a configuration of an actuator fiber is described in detail. FIG. 8 is a diagram illustrating an outline of an actuator fiber 21. Actuator fibers that have similar configurations to the actuator fiber 21 but have different sizes, shapes, and/or the like are used as the first actuator fiber 2a and the second actuator fiber 2b. Attachment units 22a and 22b are provided at both respective ends of the actuator fiber 21, and a distance between the attachment units 22a and 22b changes in accordance with stretch or contraction of the actuator fiber 21. The actuator fiber 21 has a structure in which a high polymer fiber bundle including a plurality of twisted high polymer fibers is wound spirally about a virtual axis. The high polymer fiber bundle is a bundle of a plurality of high polymer fibers but is not limited to this. The high polymer fiber bundle may be a single twisted high polymer fiber. The high polymer fiber bundle is, for example, made of a material such as nylon or polyethylene. Use of these materials makes it possible to make generated displacement large and is therefore desirable. Other high polymer materials may be used. For example, fibers having a diameter of 0.13 mm are used as the high polymer fibers. This size allows the actuator fiber 21 processed in a coil shape to have an external diameter of less than 1 mm, thereby making it easy to configure the actuator fiber 21 as a fabric, and therefore this size is desirable. However, the present embodiment is not limited to this. Thicker actuator fibers may be used to increase generated force per fiber or thinner actuator fibers may be used so that the actuator fibers can be configured as a thinner fabric. The actuator fibers can be monofilament fibers or multifilament fibers, but monofilament fibers achieve more stable performance and are therefore desirable.

In a case where the actuator fiber 21 in the state illustrated in FIG. 8(a) is heated and the temperature thereof rises, the twisted high polymer fiber bundle is untwisted. This untwisting operation occurs in each portion of the coil shape (in the actuator fiber 21), the spiral angle of the coil changes, and the actuator fiber 21 contracts by $\Delta L$ as illustrated in FIG. 8(b). When the temperature of the actuator fiber 21 drops due to natural heat radiation or the like, the high polymer fiber bundle is twisted again, and the high polymer fiber bundle stretches to the state illustrated in FIG. 8(a). Such an actuator is a light-weight and flexible actuator whose output per mass is large. The temperature of the actuator fiber 21 can be changed, for example, by a method for changing the temperature of gas and/or liquid around the actuator fiber 21 or a method for bringing a heat generator into contact with the actuator fiber 21, but a method for electrically heating the actuator fiber 21 by plating surfaces of the high polymer fibers with silver or the like to give the high polymer fibers electric conductivity and passing electricity therethrough is easy to handle and is therefore desirable. Adjustment of the temperature of the actuator fiber 21 using electric heating can be performed by adjusting an applied voltage or electric current or by adjusting a ratio of a period of electricity application and a period of the absence of electricity application like PWM driving. The electric heating can be achieved not only by a direct current but also by an alternating current.

Figure 9:
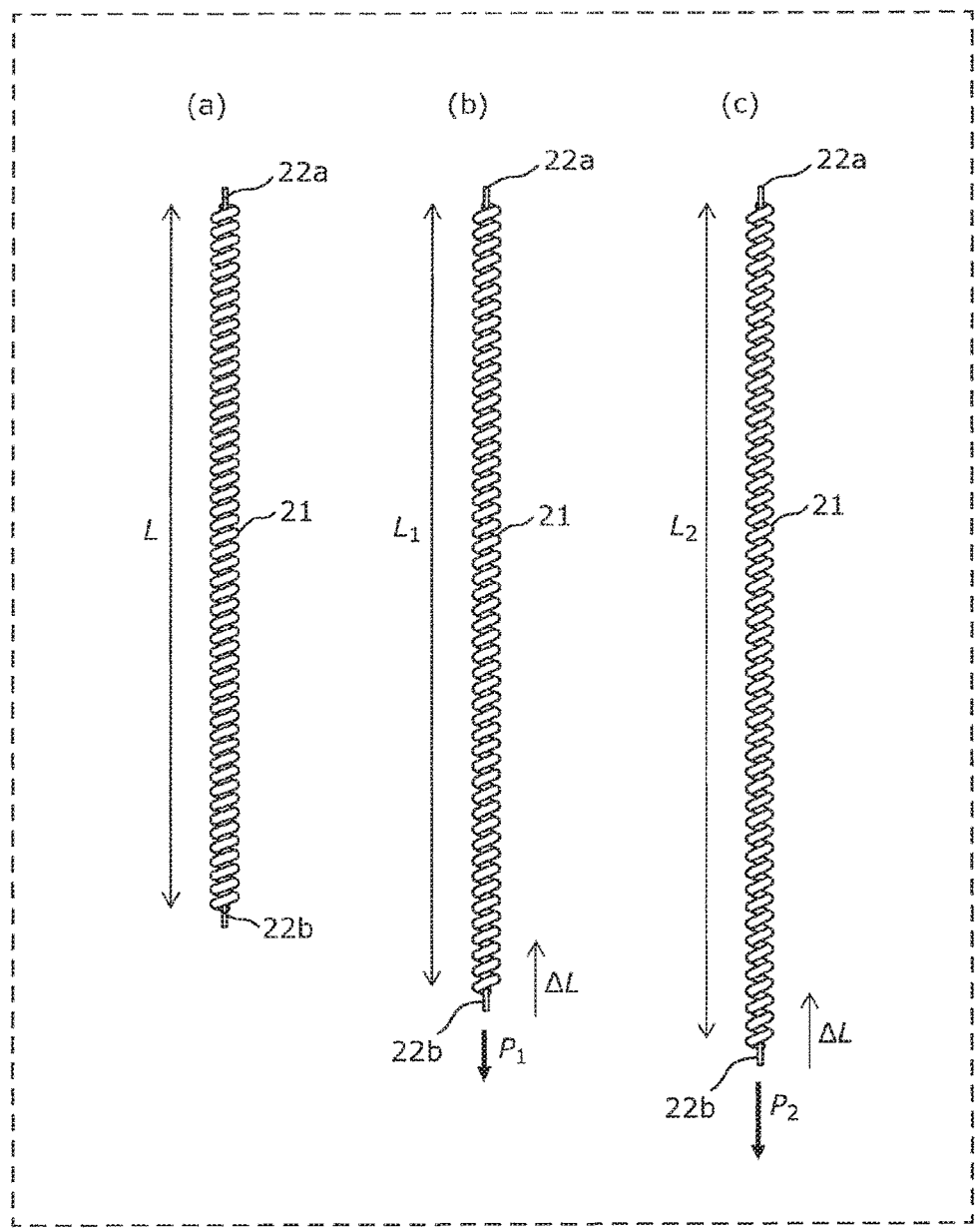
FIG. 9 is a diagram illustrating an outline of operation performed in a case where different loads are applied to the actuator fiber.

FIG. 9 is a diagram illustrating an outline of an operation performed in a case where different loads are applied to the actuator fiber 21. The actuator fiber 21 has both properties as a coil spring and properties as an actuator that generates driving force. In a case where the attachment unit 22a of the actuator fiber 21 having a natural length L illustrated in FIG. 9(a) is fixed and load P1 is applied to the attachment unit 22b in the downward direction of FIG. 9, the actuator fiber 21 shifts to the state illustrated in FIG. 9(b). A length L1 of the actuator fiber 21 in this state is expressed by $L1=L+P1/k$ where k is a spring rate of the actuator fiber 21 as a coil spring. When the temperature of the actuator fiber 21 is increased in this state, the actuator fiber 21 generates driving force and is displaced by $\Delta L$ in the upward direction of FIG. 9 against the load P1. The force Fa thus generated by the actuator fiber 21 is expressed by $Fa=k\Delta L$ and is a function of a change in temperature of the actuator fiber 21. Accordingly, the generated force Fa and $\Delta L$ generated by the force Fa can be adjusted by adjusting a change in temperature of the actuator fiber 21. A relationship between a change in temperature of the actuator fiber 21 and $\Delta L$ has small non-linearity and can be approximated by a linear shape.

Meanwhile, in a case where load P2 (>P1) is applied to the attachment unit 22b in the downward direction of FIG. 9, the actuator fiber 21 shifts to the state illustrated in FIG. 9(c). A length L2 of the actuator fiber 21 in this state is expressed by $L2=L+P2/k$. When the temperature of the actuator fiber 21 is increased in this state, the actuator fiber 21 is displaced by ΔL in the upward direction of FIG. 9 against the load P2, as in the case of FIG. 9(b). The force Fa generated by the actuator fiber 21 is expressed by Fa=kΔL. That is, the displacement of the actuator fiber 21 is not affected much by load and markedly depends on a change in temperature.

Operation of Actuator

Next, operation of the actuator 1a is described.

In the actuator 1a illustrated in FIG. 1, the plate member 5a is fixed, and the plate member 6a is configured to be freely movable in the top-bottom direction of FIG. 1 in a state where load is applied in the downward direction of FIG. 1. However, in a case where the pawls 16a and 16b are engaged with the teeth 17a, the plate member 6a is restrained so that the plate member 6a is not moved in the downward direction of FIG. 1 by load F acting on the plate member 6a.

In a case where the actuator 1a is in operation, the controller 12a of the control unit 10a short-circuits or open-circuits the switches 14a and 14b. In a case where the switch 14a is short-circuited, the first actuator fiber 2a is electrically heated, so that upward contracting force is generated in the first actuator fiber 2a. In a case where the switch 14b is short-circuited, the second actuator fiber 2b is electrically heated, so that upward contracting force is generated in the second actuator fiber 2b.

Figure 2:
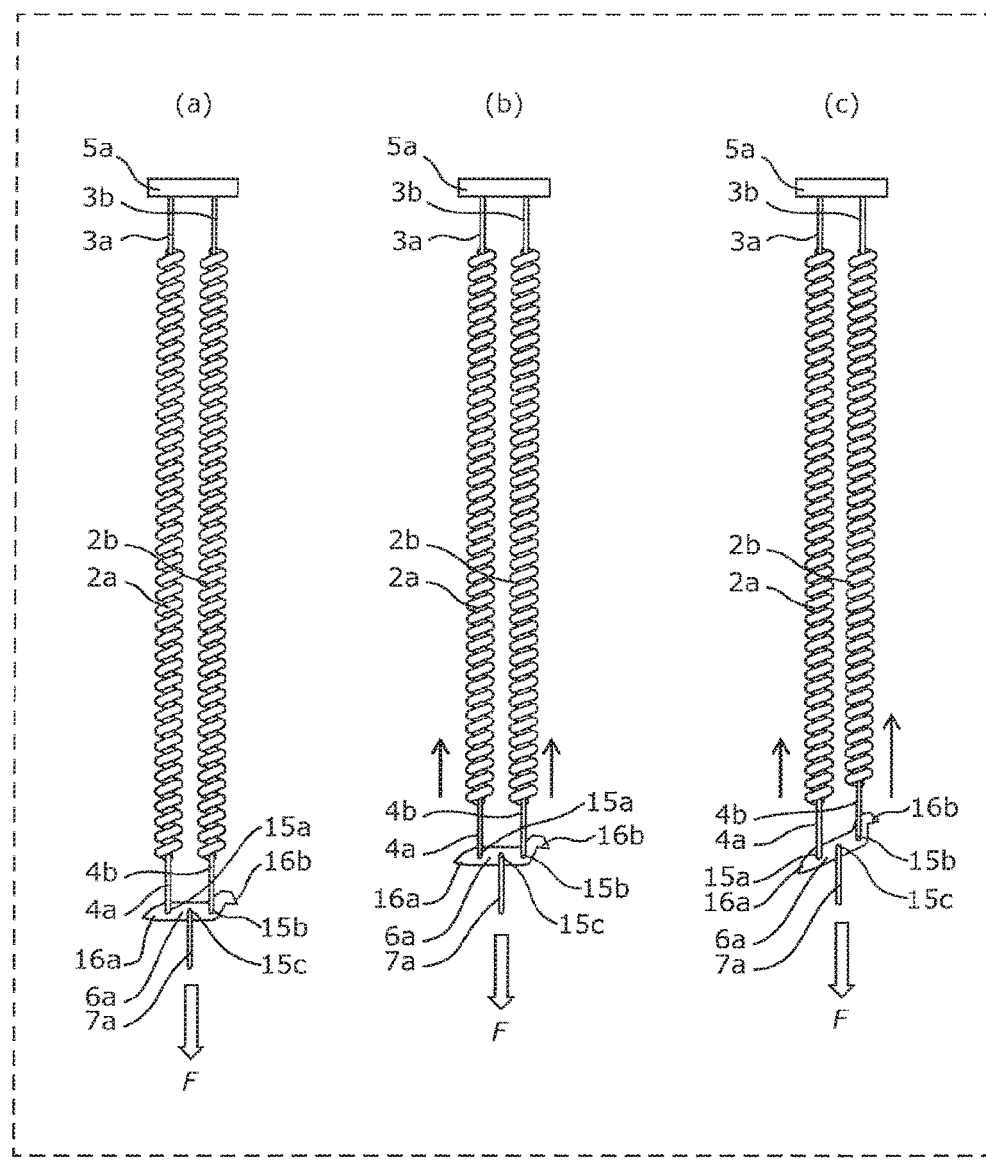
FIG. 2 is a diagram illustrating displacement of a second plate of the actuator according to Embodiment 1.

FIG. 2 is a diagram illustrating displacement of the second plate (the plate member 6a) of the actuator 1a according to the present embodiment. Note that FIG. 2 illustrates a state in a case where the frame member 8a and the joining members 9a and 9b are not present.

The state illustrated in FIG. 2(a) is a state where the first actuator fiber 2a and the second actuator fiber 2b have a room temperature and load F is applied to the plate member 6a in the downward direction of FIG. 2. The load F that acts on the plate member 6a is supported by the first actuator fiber 2a and the second actuator fiber 2b. In the present embodiment, the first actuator fiber 2a and the second actuator fiber 2b have the same spring shape and the same length. Since a distance from the supporting point 15c to the supporting point 15a is equal to a distance from the supporting point 15c to the supporting point 15b, the first actuator fiber 2a and the second actuator fiber 2b are displaced by the same length when the load F is applied to the plate member 6a, and therefore the plate member 6a is in a horizontal state where the supporting points 15a, 15b, and 15c are aligned horizontally.

The state illustrated in FIG. 2(b) is a state where the temperature of the first actuator fiber 2a and the temperature of the second actuator fiber 2b have been changed by the same amount. In this state, the same contracting force is generated in the first actuator fiber 2a and the second actuator fiber 2b, and the plate member 6a is displaced in the upward direction of FIG. 2 while keeping the horizontal state.

The state illustrated in FIG. 2(c) is a state where the temperature of the first actuator fiber 2a and the temperature of the second actuator fiber 2b have been changed so that the temperature of the second actuator fiber 2b becomes higher than that of the first actuator fiber 2a. In this state, the second actuator fiber 2b contracts by a larger amount than the first actuator fiber 2a, so that the plate member 6a is tilted by being rotated in anticlockwise direction about the supporting point 15c from the horizontal state. Note that in a case where a difference is produced in temperature between the actuator fibers, an average of the temperatures of the actuator fibers after a change in posture of the plate member 6a is desirably set equal to that before the change in posture of the plate member 6a so that the position of the plate member 6a in the top-bottom direction is not changed. For example, in a case where a temperature difference of 20° C. is produced, it is only necessary to increase the temperature of the second actuator fiber 2b by 10° C. and lower the temperature of the first actuator fiber 2a by 10° C.

In the present embodiment, by changing the temperature of the first actuator fiber 2a and the temperature of the second actuator fiber 2b by the same amount, the position of the plate member 6a is displaced upward or downward. Meanwhile, by producing a difference in temperature between the first actuator fiber 2a and the second actuator fiber 2b, an angle of the plate member 6a with respect to an axis perpendicular to a plane including the first actuator fiber 2a and the second actuator fiber 2b can be changed.

Figure 3:
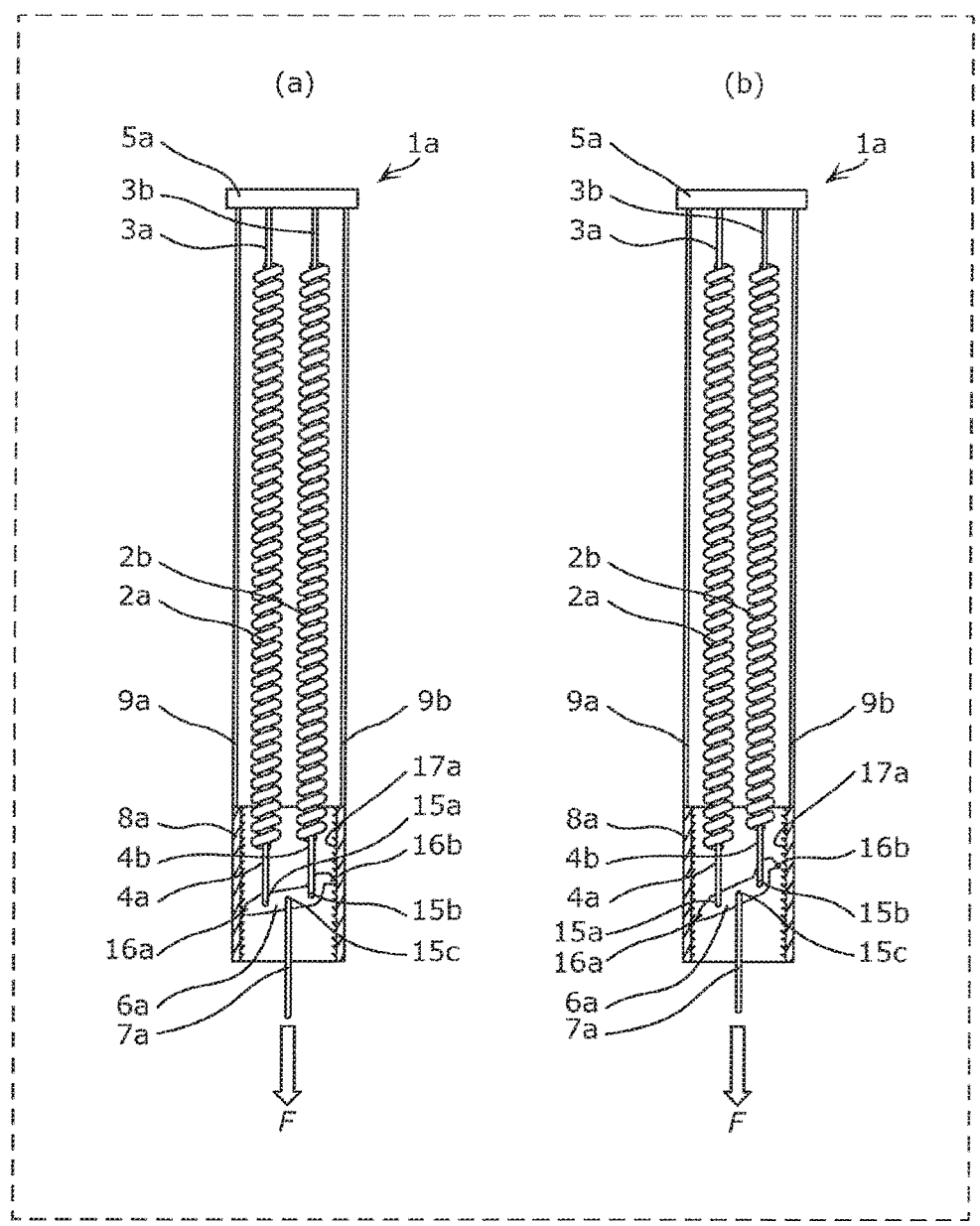
FIG. 3 is a diagram illustrating states of the second plate of the actuator according to Embodiment 1.

FIG. 3 is a diagram illustrating a state of the second plate (the plate member 6a) of the actuator 1a according to the present embodiment. FIG. 3(a) illustrates a locked state in which the plate member 6a is locked, and FIG. 3(b) illustrates an unlocked state where the plate member 6a is unlocked.

Figure 10:
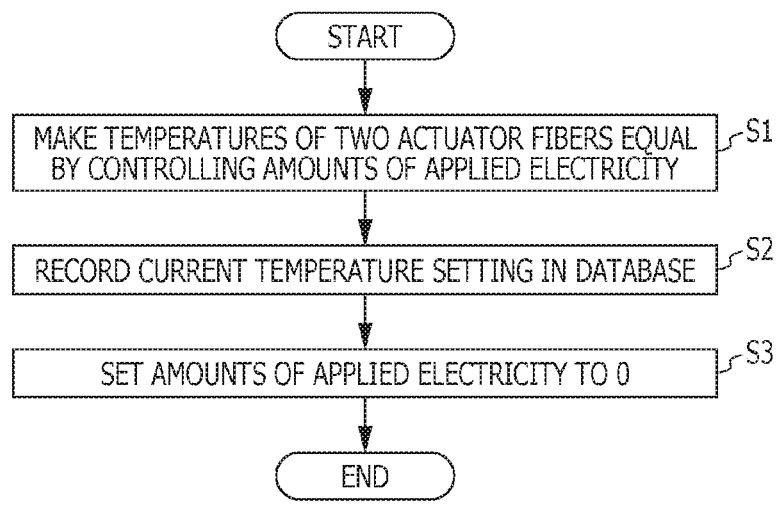
FIG. 10 is a flowchart illustrating operation performed in a case where the actuator according to Embodiment 1 receives a locking command.

FIG. 10 is a flowchart illustrating operation performed in a case where the actuator 1a according to the present embodiment receives a locking command. Upon receipt of the locking command, the controller 12a controls short-circuit or open-circuit of the switches 14a and 14b so that amounts of applied electricity that make the temperature of the first actuator fiber 2a and the temperature of the second actuator fiber 2b equal to each other are obtained (S1 in FIG. 10). In this step, the temperature of the first actuator fiber 2a and the temperature of the second actuator fiber 2b are controlled to be an average temperature of the actuator fibers on the basis of information on a relationship between an amount of applied electricity and temperature that is stored in a database 41a so that the position of the plate member 6a in the top-bottom direction is not changed. Then, current temperature setting is recorded in the database 41a (S2 in FIG. 10), and then the switches 14a and 14b are open-circuited to set the amounts of applied electricity to 0 (S3 in FIG. 10).

Figure 11:
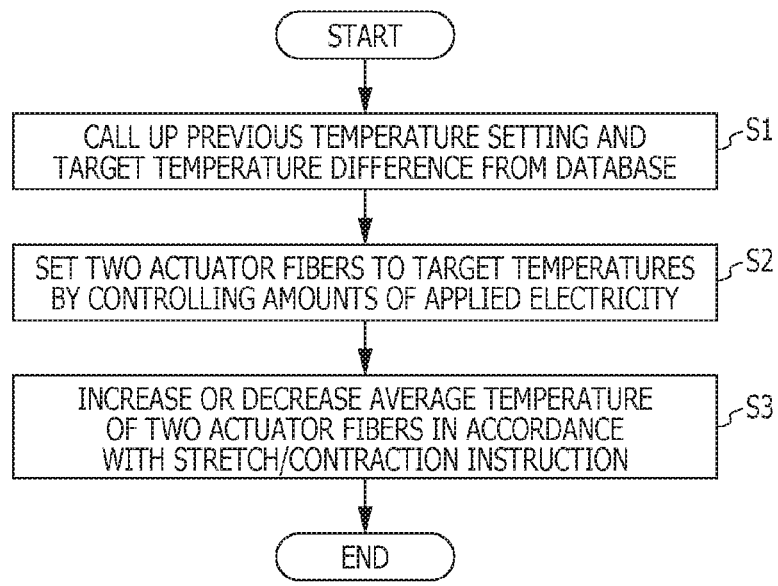
FIG. 11 is a flowchart illustrating operation performed in a case where the actuator according to Embodiment 1 receives an unlocking command.

FIG. 11 is a flowchart illustrating operation performed in a case where the actuator 1a according to the present embodiment receives an unlocking command. Upon receipt of the unlocking command, the controller 12a calls up the temperature setting recorded in response to the previous locking command and a temperature difference necessary for unlocking from the database 41a and set target temperatures of the first actuator fiber 2a and the second actuator fiber 2b (S1 in FIG. 11). The target temperatures are set so that a temperature difference necessary for unlocking is kept and an average temperature becomes the previous temperature setting. Then, short-circuit or open-circuit of the switches 14a and 14b is controlled so that the first actuator fiber 2a and the second actuator fiber 2b reach the target temperatures on the basis of the information on a relationship between an amount of applied electricity and temperature that is stored in the database 41a (S2 in FIG. 11). Then, the average temperature is increased or decreased in accordance with a stretch/contraction instruction while keeping the temperature difference between the first actuator fiber 2a and the second actuator fiber 2b until a locking command is given (S3 in FIG. 11).

In the present embodiment, in a case where the position of the plate member 6a is displaced, the plate member 6a is moved in a state where a difference is produced in temperature between the first actuator fiber 2a and the second actuator fiber 2b, i.e., a state where the plate member 6a is tilted, as illustrated in FIG. 3(b). This makes it possible to displace the position of the plate member 6a without engaging the pawls 16a and 16b with the teeth 17a. However, for example, in a case where the load F has not only a component in the top-bottom direction of FIG. 3, but also a component in the left-right direction of FIG. 3, there is a risk that the pawls 16a and 16b are engaged with the teeth 17a when the plate member 6a is moved. In such a case, a guide member (not illustrated) that constraints the position of the supporting point 15c in the left-right direction may be provided so that the plate member 6a is located at the center of the frame member 8a.

The tilt of the plate member 6a is returned to the original state as illustrated in FIG. 3(a) by making the temperature of the first actuator fiber 2a the same as that of the second actuator fiber 2b after the plate member 6a reaches a target position. This change in tilt causes the pawls 16a and 16b to be engaged with the teeth 17a, thereby shifting the plate member 6a to the locked state where the plate member 6a is locked to the frame member 8a. Note that the tilt is tilt of the plate member 6a relative to the axis of the frame member 8a having a cylindrical shape. For example, a state where the tilt is horizontal is a case where a line connecting the supporting points 15a and 15b is at a right angle with respect to the axis of the frame member 8a having a cylindrical shape.

In the locked state, the load F is transmitted to the plate member 5a via the frame member 8a and the joining members 9a and 9b, and thus the position of the plate member 6a in the top-bottom direction can be maintained even if no energy is input to the first actuator fiber 2a and the second actuator fiber 2b (even if the temperature of the first actuator fiber 2a and the temperature of the second actuator fiber 2b return to a room temperature).

Then, a difference is produced in temperature between the first actuator fiber 2a and the second actuator fiber 2b again as illustrated in FIG. 3(b). That is, the second actuator fiber 2b is contracted, and the first actuator fiber 2a is stretched. This shifts the plate member 6a to an unlocked state where the plate member 6a is unlocked from the frame member 8a.

As described above, in the actuator 1a according to the present embodiment, the plate member 6a is switched between the locked state and the unlocked state by changing the tilt of the plate member 6a by using a stretch/contraction operation of the first actuator fiber 2a and the second actuator fiber 2b and thereby locking or unlocking the plate member 6a to/from the frame member 8a. In a case where the actuator 1a is driven, the position can be freely displaced in the unlocked state, whereas in a case where the position displaced by driving is maintained, the load F can be held in the locked state. As a result, it is possible to make consumption of energy that is input to the actuator 1a low.

In the present embodiment, for convenience of description, the state of the plate member 6a illustrated in FIG. 2(a) is referred to as a horizontal state since the supporting points 15a, 15b, and 15c are aligned horizontally in FIG. 2(a), and the state of the plate member 6a illustrated in FIG. 2(c) is referred to as a tilted state. However, the present embodiment is not limited to this. It is only necessary that an angle of the plate member 6a with respect to the axis of the supporting point 15c that is perpendicular to the plane including the first actuator fiber 2a and the second actuator fiber 2b is changed in accordance with a difference in temperature between the first actuator fiber 2a and the second actuator fiber 2b, and the plate member 6a is switched between the locked state and the unlocked state in accordance with the change of the angle.

As described above, according to the present embodiment, the plate member 6a can be switched between the locked state and the unlocked state by causing the control unit 10a to adjust a difference in displacement between the first actuator fiber 2a and the second actuator fiber 2b while almost entirely constituting the actuator 1a by linear members. It is therefore possible to obtain the actuator 1a that can hold displacement with a flexible and simple configuration.

In the present embodiment, the first actuator fiber 2a and the second actuator fiber 2b that have the same spring shape and the same length are used. This allows the actuator fibers to have equal spring rates and react equally to input energy, thereby making it easy to handle the actuator 1a, and therefore this is desirable. However, the present embodiment is not limited to this. It is also possible to employ a configuration in which a spring rate of the first actuator fiber 2a is different from that of the second actuator fiber 2b. Even in a case where the spring rate of the first actuator fiber 2a is different from that of the second actuator fiber 2b, moments around the supporting point 15c that are caused by the first actuator fiber 2a and the second actuator fiber 2b when the plate member 6a is displaced can be balanced out by adjusting a distance between the supporting point 15c and the supporting point 15a and a distance between the supporting point 15c and the supporting point 15b in accordance with a ratio of the spring rates.

In the present embodiment, each of the first actuator fiber 2a and the second actuator fiber 2b is constituted by a single actuator fiber. However, the present embodiment is not limited to this. Each of the first actuator fiber 2a and the second actuator fiber 2b may be constituted by a plurality of actuator fibers.

Modification of Embodiment 1

Figure 4:
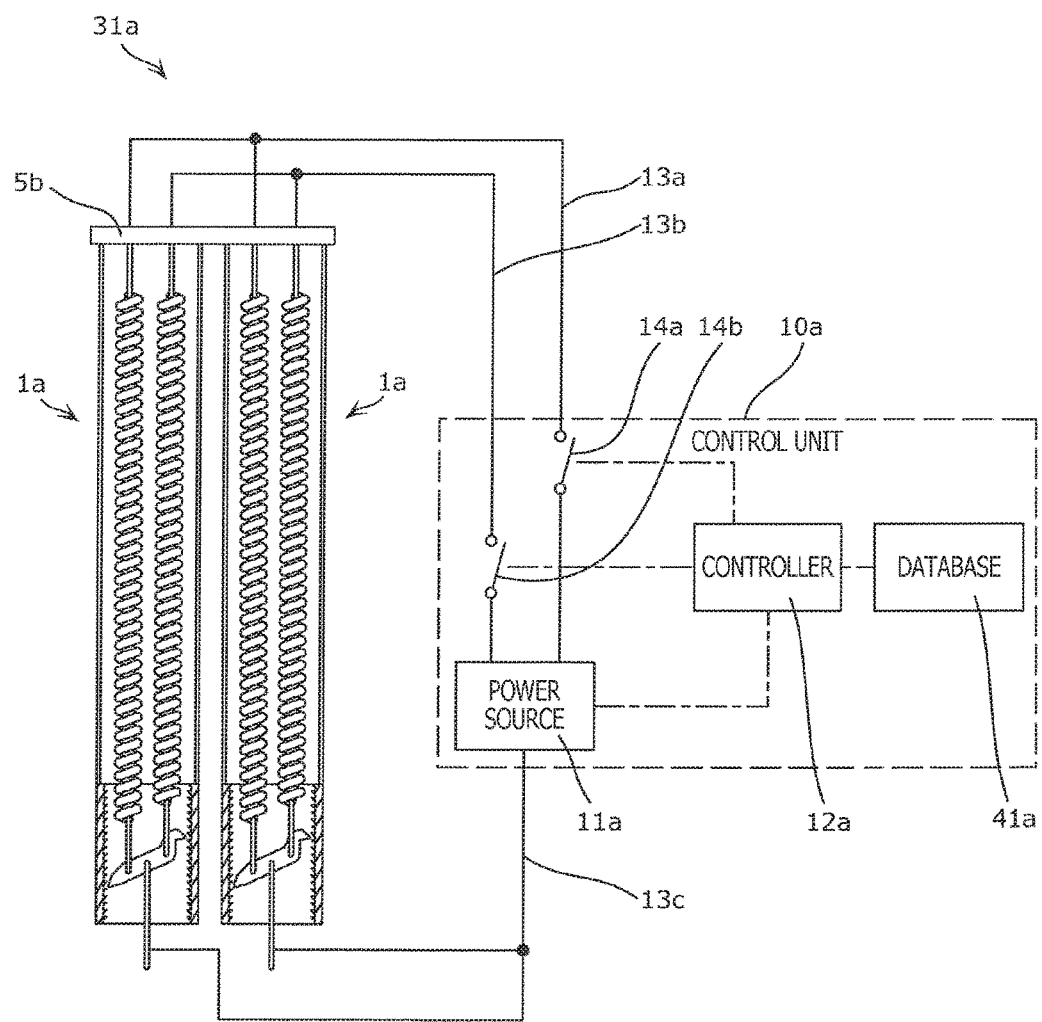
FIG. 4 is a diagram illustrating an actuator set in which actuators according to Embodiment 1 are disposed in parallel with each other.

FIG. 4 is a diagram illustrating an actuator set 31a according to a modification of Embodiment 1.

The actuator set 31a has a structure in which actuators 1a are provided in parallel with each other so as to share a plate member 5b which is an example of a first plate. The two actuators 1a also share wires 13a, 13b, and 13c. Accordingly, the two actuators 1a are operated together by the control unit 10a. According to this configuration, load can be held by the plurality of actuators 1a provided in parallel with each other. This reduces burden on each of the actuators 1a. Since thinner actuator fibers can be used, the actuator set 31a that is thin as a whole can be obtained.

In this modification, the two actuators 1a are driven by the single control unit 10a. However, this modification is not limited to this. The two actuators 1a may be driven by respective different control units.

In the actuator set 31a according to the modification, the two actuators 1a are provided in parallel with each other. However, this modification is not limited to this. Three or more actuators 1a may be provided in parallel with each other.

In the present embodiment, the actuator fibers are made of nylon. However, the material of the actuator fibers is not limited to this. The actuator fibers can be made of any of various high polymer materials such as polyethylene, PVDF, polyester, or Kevlar.

In the present embodiment, the temperature of the actuator fibers is changed by silver-plating surfaces of the actuator fibers and electrically heating the actuator fibers. This method is easy to handle and is therefore desirable. However, the present embodiment is not limited to this. The actuator fibers may be electrically heated by plating the surfaces with an electrically conductive material other than silver, by making the actuator fibers electrically conductive by blending an electrically conductive material in the high polymer material, or by winding an electrically conductive material around the actuator fibers. Furthermore, the temperature of the actuator fibers may be changed, for example, by changing the temperature of gas around the actuator fibers or by changing the temperature of liquid that is in contact with the actuator fibers. In a case where the surfaces of the actuator fibers are made electrically conductive, the surfaces may be coated so as to be insulated in order to prevent electrical contact with an adjacent actuator fiber.

In the present embodiment, high polymer fibers are used as actuator fibers. However, the present embodiment is not limited to this. A fibrous shape-memory alloy that is wound spirally can also be used.

Application Example of Embodiment 1

Figure 14:
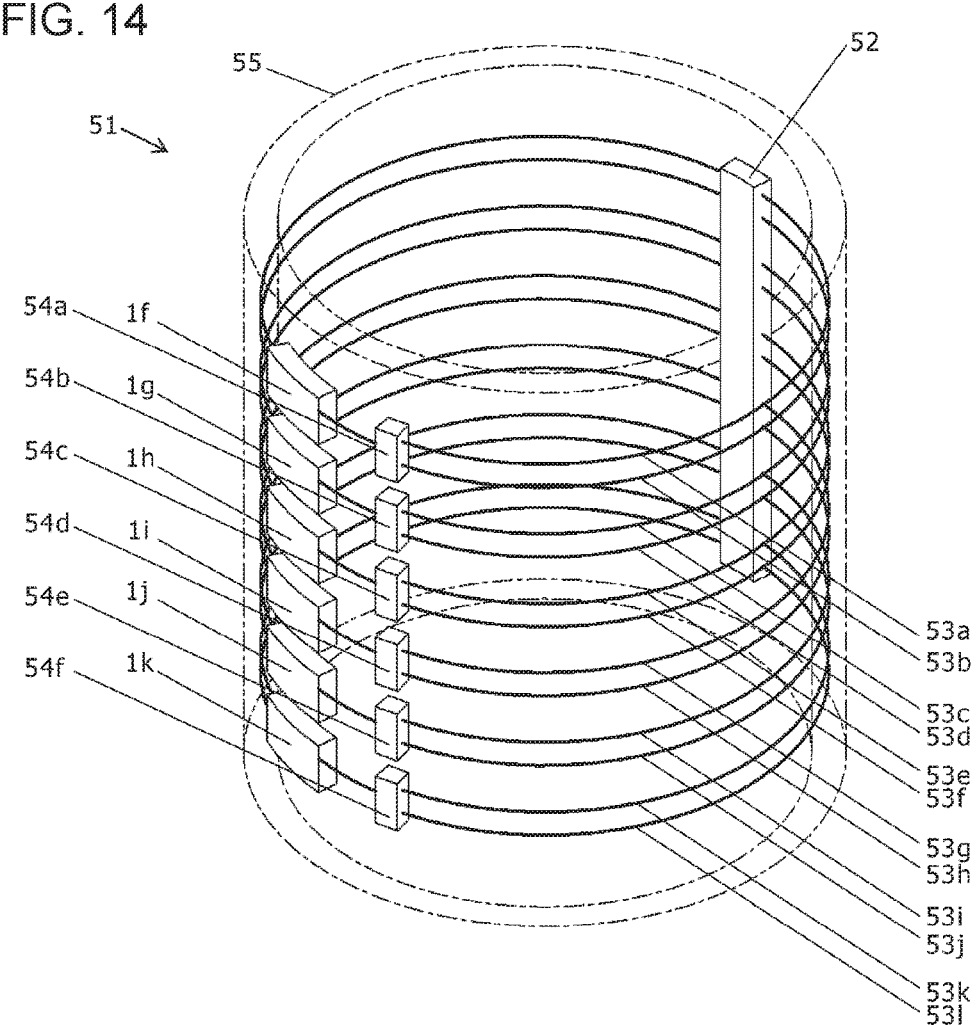
FIG. 14 is a diagram illustrating an outline of a contraction belt to which Embodiment 1 is applied.

FIG. 14 is a diagram illustrating an outline of a contraction belt 51 to which Embodiment 1 is applied. In the contraction belt 51, a plate member 52, an actuator 1*f*, a plate member 54*a*, and elastic fibers 53*a* and 53*b* are connected so as to form a ring. Similarly, the plate member 52, an actuator 1*g*, a plate member 54*b*, and elastic fibers 53*c* and 53*d* are connected so as to form a ring. Similarly, the plate member 52, an actuator 1*h*, a plate member 54*c*, and elastic fibers 53*e* and 53*f* are connected so as to form a ring. Similarly, the plate member 52, an actuator 1*i*, a plate member 54*d*, and elastic fibers 53*g* and 53*h* are connected so as to form a ring. Similarly, the plate member 52, an actuator 1*j*, a plate member 54*e*, and elastic fibers 53*i* and 53*j* are connected so as to form a ring. Similarly, the plate member 52, an actuator 1*k*, a plate member 54*f*, and elastic fibers 53*k* and 53*l* are connected so as to form a ring. Furthermore, the whole contraction belt 51 is covered with fabric 55.

Figure 15:
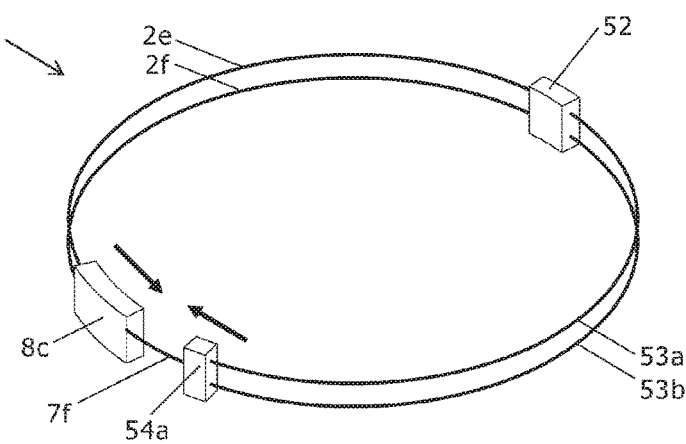
FIG. 15 is a diagram illustrating an outline of part of the contraction belt.

FIG. 15 is a diagram illustrating an outline of part of the contraction belt 51. FIG. 15 illustrates part that is constituted by the plate member 52, the actuator 1*f*, the plate member 54*a*, and the elastic fibers 53*a* and 53*b*. The actuator 1*f* is constituted by a first actuator fiber 2*c*, a single second actuator fiber 2*d*, a frame member 8*c*, which is an example of a locking unit, a linear member 7*f*, and the like. The plate member 52 acts as an example of a first plate.

According to this configuration, when the actuator 1*f* contracts, the entire circumference can be shortened. Assume that a human arm, leg, waist, or the like is put into the contraction belt 51, contraction of the actuator 1*f* shortens the entire circumference, and thus the actuator 1*f* makes close contact with the human arm, leg, waist, or the like. Thereafter, the elastic fibers 53*a* and 53*b* are stretched while keeping the close contact. In this state, by shifting the actuator 1*f* into a locked state, the state where the actuator 1*f* is in close contact with the human arm, leg, waist, or the like due to elastic force of the elastic fibers 53*a* and 53*b* can be kept without energy consumption. The actuators 1*g*, 1*h*, 1*i*, 1*j*, and 1*k* operate in a similar manner and thus make close contact with the human arm, leg, waist, or the like so as to follow the shape of the human arm, leg, waist, or the like. In this way, a cloth, an assist suit, a wearable terminal, or the like can be held around a body part.

Note that the fabric 55 is not necessarily essential in the contraction belt 51 but has an effect of reducing burden in a case where the contraction belt 51 is wound around a body part or the like.

Note that the contraction belt 51 has a cylindrical shape, but the shape thereof is not limited to this. The contraction belt 51 may be configured so that the diameter thereof changes. The length of the circumference may be made variable by using known means such as a general belt. This makes it possible to wind the contraction belt 51 firmly around a human body or the like even if the amount of contraction of the actuators 1*f*, 1*g*, 1*h*, 1*i*, 1*j*, and 1*k* is small.

Note that the elastic fibers 53*a*, 53*b*, 53*c*, 53*d*, 53*e*, 53*f*, 53*g*, 53*h*, 53*i*, 53*j*, 53*k*, and 53*l* may be fibers that have elasticity from the beginning such as rubber or may be fibers that have been given elasticity by being shaped in a coil.

In the application example of Embodiment 1, two elastic fibers are combined with a single actuator, but this application example is not limited to this. One or more elastic fibers can be combined.

Embodiment 2

Configuration of Actuator

Figure 5:
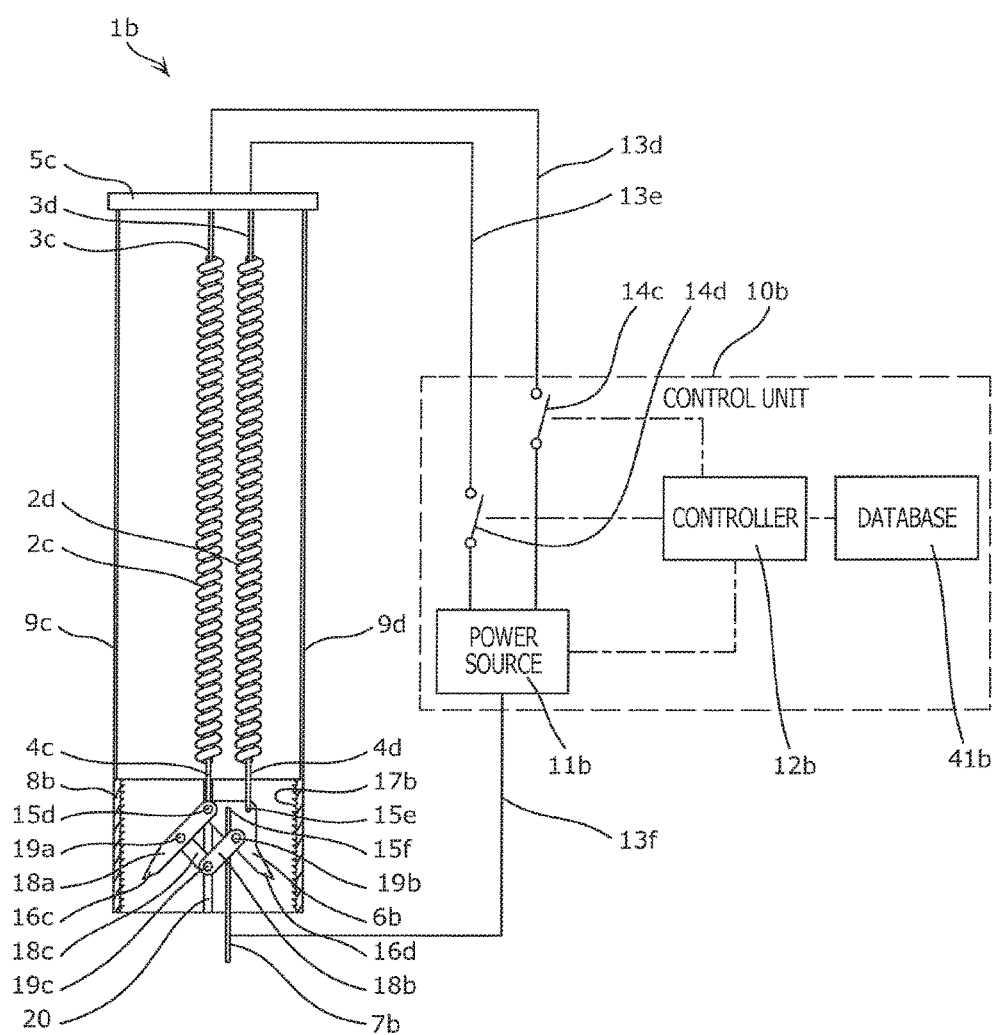
FIG. 5 is a diagram illustrating an outline of an actuator according to Embodiment 2.

FIG. 5 is a diagram illustrating an outline of an actuator 1*b* according to the present embodiment. The actuator 1*b* includes a single first actuator fiber 2*c* and a single second actuator fiber 2*d*. The first actuator fiber 2*c* and the second actuator fiber 2*d* are located between a plate member 5*c*, which is an example of a first plate, and a plate member 6*b*, which is an example of a second plate. A frame member 8*b*, which is an example of a locking unit, is provided around a side face of the plate member 6*b*.

Each of the first actuator fiber 2*c* and the second actuator fiber 2*d* has a coil-like structure in which a high polymer fiber bundle including one or more twisted high polymer fibers (nylon fibers) is wound spirally. Surfaces of the first actuator fiber 2*c* and the second actuator fiber 2*d* are silver-plated. The first actuator fiber 2*c* and the second actuator fiber 2*d* are resistively heated (electrically heated) upon application of electricity and stretch and contract in accordance with a change in temperature caused by the electric heating. In the present embodiment, a direction of twisting of the high polymer fiber bundle and a direction of winding of the spiral are the same as each other, and the first actuator fiber 2*c* or the second actuator fiber 2*d* contracts upon application of heat to the first actuator fiber 2*c* or the second actuator fiber 2*d*.

The first actuator fiber 2*c* and the second actuator fiber 2*d* have the same spring shape and the same length and have an equal spring rate. Note that the expression "the same spring shape" means that the first actuator fiber 2*c* and the second actuator fiber 2*d* are the same in terms of coil diameter, spring pitch, and wire diameter of a high polymer fiber bundle that will be described later.

Note that the number of first actuator fibers 2*c* and the number of second actuator fibers 2*d* are not limited to 1, and a plurality of first actuator fibers 2*c* and a plurality of second actuator fibers 2*d* may be provided between the plate member 5*c* and the plate member 6*b*. In this case, a spring rate of each of the plurality of first actuator fibers 2*c* is equal to that of each of the plurality of second actuator fibers 2*d*.

One ends of the first actuator fiber 2*c* and the second actuator fiber 2*d* are connected to the plate member 5*c* via connection members 3*c* and 3*d*, respectively. The other ends of the first actuator fiber 2*c* and the second actuator fiber 2*d* are connected to the plate member 6*b* via connection members 4*c* and 4*d*, respectively.

Each of the connection members 3*c* and 3*d* and the connection members 4*c* and 4*d* is, for example, made of a linear material. According to this configuration, the actuator 1b can be given flexibility against bending. The material can be high polymer fibers, carbon fibers, a metal wire, or the like. The high polymer fibers and the carbon fibers are light in weight and are therefore desirable. The metal wire is more desirably a material, such as a superelastic alloy, having flexibility against bending.

The plate member 6b has a supporting point 15d connected to the connection member 4c, a supporting point 15e connected to the connection member 4d, and a supporting point 15f connected to a linear member 7b. The plate member 6b is rotatably connected to the connection members 4c and 4d at the supporting points 15d and 15e. The linear member 7b is rotatably connected to the plate member 6b at the supporting point 15f. Load acts on the linear member 7b in the downward direction of FIG. 5. The supporting points 15d, 15e, and 15f are on a straight line so that the supporting point 15f is disposed between the supporting points 15d and 15e, and a space between the supporting point 15d and the supporting point 15f is equal to that between the supporting point 15e and the supporting point 15f.

Furthermore, a linking member 18a is rotatably connected to the plate member 6b at the supporting point 15d. The plate member 6b has a supporting point 19b connected to a linking member 18b. The linking member 18b is rotatably connected to the plate member 6b at the supporting point 19b. Supporting points 19a and 19c are provided on the linking members 18a and 18b, respectively, and a linking member 18c is rotatably provided at the supporting points 19a and 19c. As a result, a four-joint link is constituted by the plate member 6b and the linking members 18a, 18b, and 18c. A space between the supporting points 19a and 19c, a space between the supporting points 19b and 19c, a space between the supporting points 19a and 15d, and a space between the supporting points 19b and 15d in the four-joint link are equal to one another.

The frame member 8b having a cylindrical shape is provided around side faces of the plate member 6b and the linking members 18a, 18b, and 18c. The frame member 8b is disposed so that a side surface thereof is located outside the plate member 6b in a direction perpendicular to a direction in which the first actuator fiber 2c extends. The frame member 8b is fixed to the plate member 5c with linear joining members 9c and 9d interposed therebetween so that a predetermined distance is secured between the frame member 8b and the plate member 5c. Note that the frame member 8b is not limited to the one having a cylindrical shape and may be made up of two opposing plates and a plurality of support pillars sandwiched between the two opposing plates.

The joining members 9c and 9d can be made of high polymer fibers, carbon fibers, a metal wire, or the like. The high polymer fibers and the carbon fibers are light in weight and are therefore desirable. The metal wire is more desirably a material, such as a superelastic alloy, having flexibility against bending.

The frame member 8b has a hollow structure having a quadrangular cross section, and teeth 17b are provided on an inner side surface of the frame member 8b. Furthermore, a groove-like guide member 20 is provided on the inner surface of the frame member 8b. The supporting point 15d and the supporting point 19c are restrained in the left-right direction of FIG. 5 and is guided in the top-bottom direction so as to be freely movable by the guide member 20. With this configuration, the linking members 18a, 18b, and 18c also operate together in accordance with a change of the angle of the plate member 6b, and thus the four-joint link stretches or contracts in the left-right direction. Pawls 16c and 16d are provided at an end of the linking member 18a and an end of the plate member 6b, respectively. When the plate member 6b is tilted from a horizontal state, and the four-joint link moves so as to be opened in the left-right direction, the pawls 16c and 16d are engaged with the teeth 17b. By thus engaging the pawls 16c and 16d with the teeth 17b, the position of the plate member 6b in the top-bottom direction that has been displaced by driving can be maintained.

The actuator 1b is driven by a control unit 10b. The control unit 10b includes a power source 11b, a controller 12b, and switches 14c and 14d. The controller 12b switches a connection state between a wire 13d and the power source 11b by switching on and off the switch 14c and thus controls electricity application to the first actuator fiber 2c. The controller 12b switches a connection state between a wire 13e and the power source 11b by switching on and off the switch 14d and thus controls electricity application to the second actuator fiber 2d. The wire 13d is electrically connected to the first actuator fiber 2c via the plate member 5c and the connection member 3c. Similarly, the wire 13e is electrically connected to the second actuator fiber 2d via the plate member 5c and the connection member 3d. The plate member 5c is configured such that the wires 13d and 13e are not electrically conductive with each other.

In a case where the connection members 3c and 3d are made of an electrically conductive material, the connection members 3c and 3d can be used as wires as they are. In a case where the connection members 3c and 3d are made of a material that is not electrically conductive, electrical connection between the wire 13d and the first actuator fiber 2c and electrical connection between the wire 13e and the second actuator fiber 2d may be secured, for example, by metal-plating surfaces of the connection members 3c and 3d or forming an electrically conductive material on the surfaces. In the present embodiment, the power source 11b is electrically connected to each of the first actuator fiber 2c and the second actuator fiber 2d via the plate member 5c and the connection members 3c and 3d. However, the present embodiment is not limited to this. The wire 13d and the first actuator fiber 2c or the wire 13e and the second actuator fiber 2d may be directly connected to each other.

Furthermore, a wire 13f is connected to the power source 11b. The wire 13f is connected to the linear member 7b. The wire 13f is electrically connected to the first actuator fiber 2c and the second actuator fiber 2d via the linear member 7b, the supporting point 15f, the plate member 6b, the supporting points 15d and 15e, and the connection members 4c and 4d. In the present embodiment, each of the linear member 7b, the supporting point 15f, the plate member 6b, the supporting points 15d and 15e, and the connection members 4c and 4d is electrically conductive. However, the present embodiment is not limited to this. The wire 13f and the first actuator fiber 2c or the wire 13f and the second actuator fiber 2d may be directly connected to each other.

The temperature of the first actuator fiber 2c is adjusted by electric heating based on an ON/OFF operation of the switch 14c. The temperature of the second actuator fiber 2d is adjusted by electric heating based on an ON/OFF operation of the switch 14d. The temperature may be adjusted by adjusting a voltage or an electric current that is applied to the first actuator fiber 2c or the second actuator fiber 2d by the power source 11b or may be adjusted by adjusting periods in which the switches 14c and 14d are switched ON and OFF by the controller 12b, for example, like PWM driving. When the same amount of energy is input to the first actuator fiber 2c and the second actuator fiber 2d by the control unit 10b, the temperature of the first actuator fiber 2c and the temperature of the second actuator fiber 2d can be made equal to each other. Meanwhile, when different amounts of energy are input to the first actuator fiber 2c and the second actuator fiber 2d, the temperature of the first actuator fiber 2c and the temperature of the second actuator fiber 2d can be made different from each other.

In the actuator 1b according to the present embodiment, the length of the first actuator fiber 2c and the length of the second actuator fiber 2d can be changed by adjusting the temperature of the first actuator fiber 2c and the temperature of the second actuator fiber 2d. By changing the lengths and thereby changing tilt of the plate member 6b and the linking member 18a, the pawls 16c and 16d and the teeth 17b can be engaged or disengaged.

Operation of Actuator

Next, operation of the actuator 1b is described.

In the actuator 1b illustrated in FIG. 5, the plate member 5c is fixed, and the plate member 6b and the linking members 18a, 18b, and 18c are configured to be freely movable in the top-bottom direction of FIG. 5 in a state where load is applied in the bottom direction of FIG. 5. However, in a case where the pawls 16c and 16d are engaged with the teeth 17b, the plate member 6b and the linking members 18a, 18b, and 18c are restrained so that the plate member 6b and the linking members 18a, 18b, and 18c are not moved in the downward direction of FIG. 5 by load F acting on the plate member 6b.

In a case where the actuator 1b is in operation, the controller 12b of the control unit 10b short-circuits or open-circuits the switches 14c and 14d. In a case where the switch 14c is short-circuited, the first actuator fiber 2c is electrically heated, so that upward contracting force is generated in the first actuator fiber 2c. In a case where the switch 14d is short-circuited, the second actuator fiber 2d is electrically heated, so that upward contracting force is generated in the second actuator fiber 2d.

Figure 6:
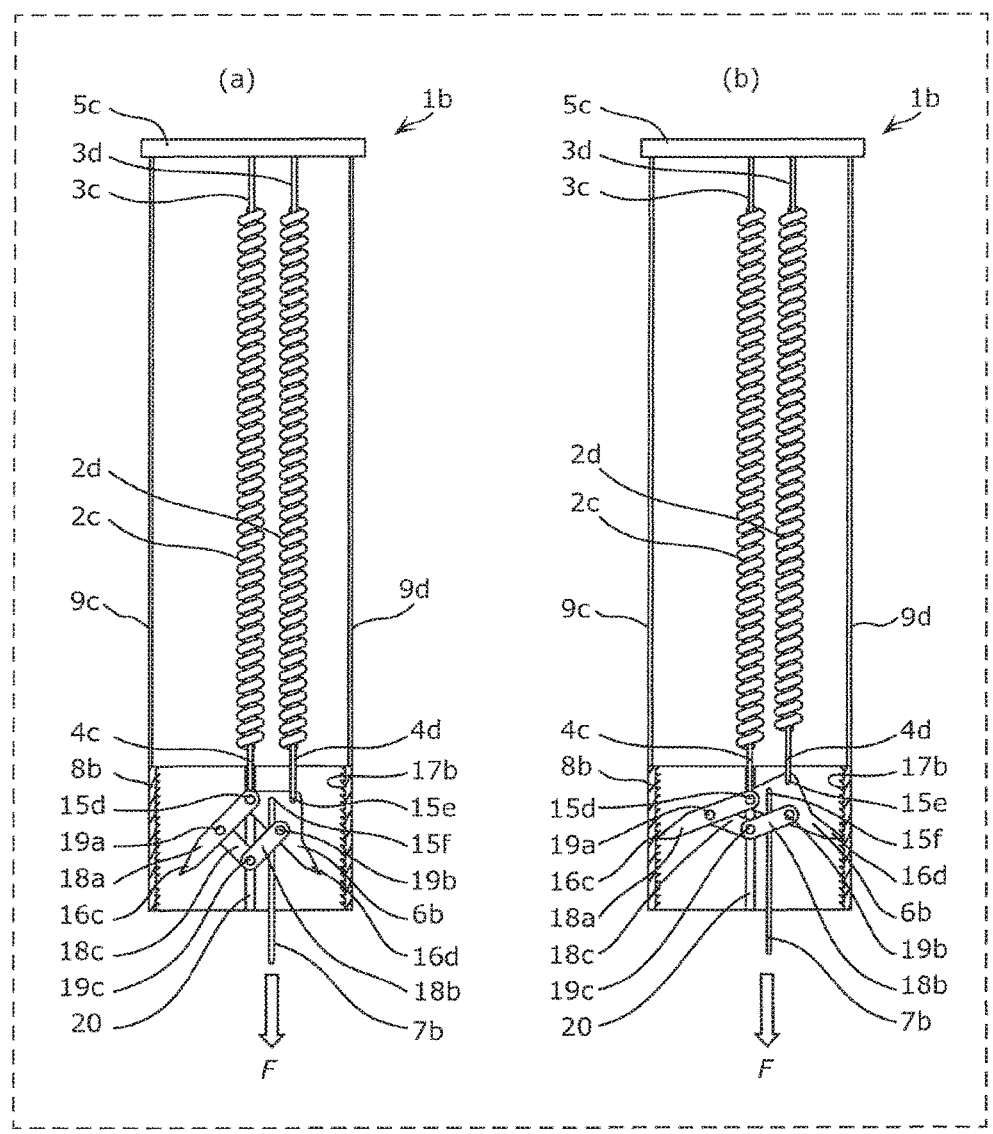
FIG. 6 is a diagram illustrating states of a second plate of the actuator according to Embodiment 2.

FIG. 6 is a diagram illustrating displacement of the second plate (the plate member 6b) of the actuator 1b according to the present embodiment. FIG. 6(a) illustrates an unlocked state where the plate member 6b is unlocked, and FIG. 6(b) illustrates a locked state where the plate member 6b is locked.

Figure 12:
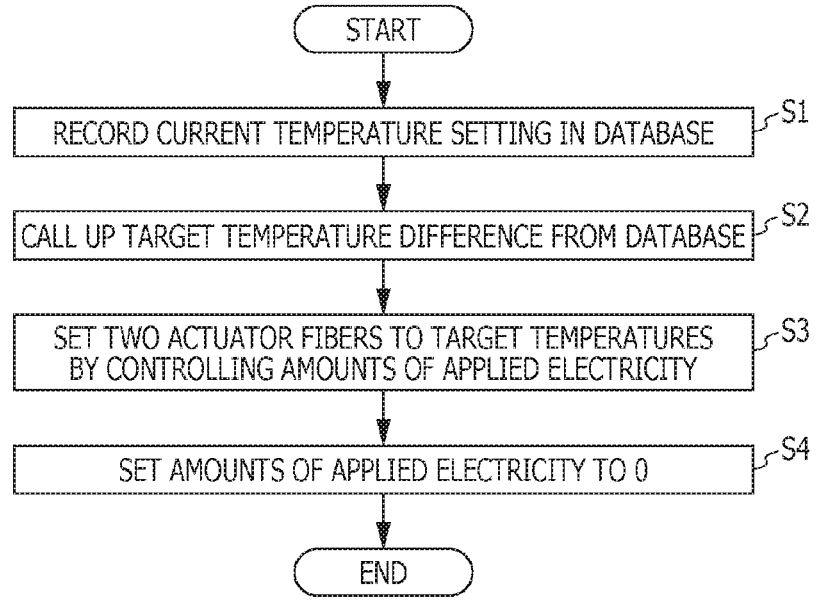
FIG. 12 is a flowchart illustrating operation performed in a case where the actuator according to Embodiment 2 receives a locking command.

FIG. 12 is a flowchart illustrating operation performed in a case where the actuator 1b according to the present embodiment receives a locking command. Upon receipt of the locking command, the controller 12b records current temperature setting in a database 41b (S1 in FIG. 12), and then calls up a temperature difference necessary for locking and sets target temperatures of the first actuator fiber 2c and the second actuator fiber 2d (S2 in FIG. 12). The target temperatures are set so that a current average temperature is kept and a target temperature difference is produced. Then, short-circuit or open-circuit of the switches 14c and 14d is controlled so that the first actuator fiber 2c and the second actuator fiber 2d reach the target temperatures on the basis of information on a relationship between an amount of applied electricity and temperature that is stored in the database 41b (S3 in FIG. 12). Then, the switches 14c and 14d are open-circuited to set the amounts of applied electricity to 0 (S4 in FIG. 12)

Figure 13:
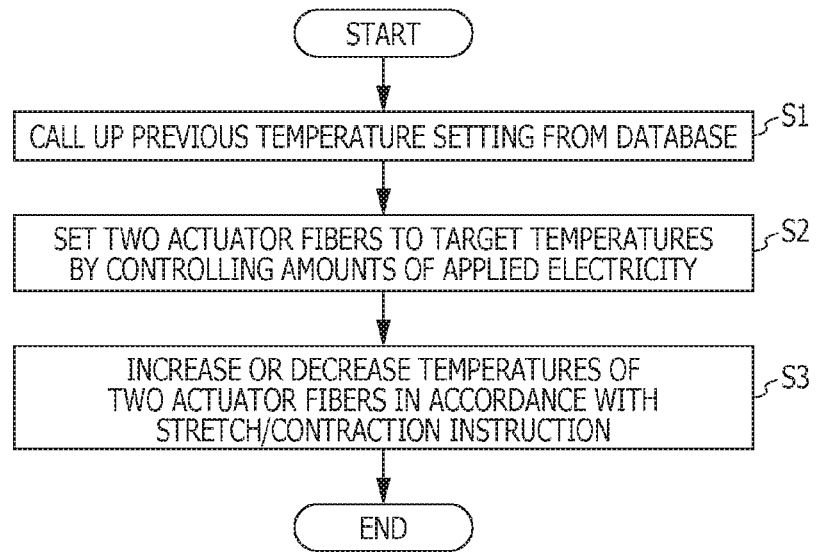
FIG. 13 is a flowchart illustrating operation performed in a case where the actuator according to Embodiment 2 receives an unlocking command.

FIG. 13 is a flowchart illustrating operation performed in a case where the actuator 1b according to the present embodiment receives an unlocking command. Upon receipt of the unlocking command, the controller 12b calls up the temperature setting recorded in response to the previous locking command from the database 41b and sets target temperatures of the first actuator fiber 2c and the second actuator fiber 2d (S1 in FIG. 13). The target temperatures are temperature setting recorded in response to the previous locking command. Then, short-circuit or open-circuit of the switches 14c and 14d is controlled so that the first actuator fiber 2c and the second actuator fiber 2d reach the target temperatures on the basis of the information on a relationship between an amount of applied electricity and temperature that is stored in the database 41b (S2 in FIG. 13). Then, the temperatures of the first actuator fiber 2c and the second actuator fiber 2d are increased or decreased while being made equal to each other in accordance with a stretch/contraction instruction until a locking command is given (S3 in FIG. 13).

In the present embodiment, in a case where the position of the plate member 6b is displaced, the plate member 6b is driven in a state where no difference in temperature occurs between the first actuator fiber 2c and the second actuator fiber 2d as illustrated in FIG. 6(a). That is, the plate member 6b is driven in a state where the plate member 6b is not tilted (in a state where a straight line connecting the supporting points 15d, 15e, and 15f is horizontal). This makes it possible to displace the position of the plate member 6b without engaging the pawls 16c and 16d with the teeth 17b.

A difference is produced in temperature between the first actuator fiber 2c and the second actuator fiber 2d after the plate member 6b reaches a target position. Specifically, the temperature of the first actuator fiber 2c is lowered, and the temperature of the second actuator fiber 2d is increased. This rotates the plate member 6b about the supporting point 15f in anticlockwise direction, thereby changing tilt of the plate member 6b, as illustrated in FIG. 6(b). Along with this rotation, the linking member 18a rotates in clockwise direction due to the four-joint link. This causes the pawls 16c and 16d to be engaged with the teeth 17b, thereby shifting the plate member 6b to the locked state where the plate member 6b is locked to the frame member 8b. In the locked state, the load F is transmitted to the plate member 5c via the frame member 8b and the joining members 9c and 9d, and the position of the plate member 6b in the top-bottom direction can be maintained even if no energy is input to the first actuator fiber 2c and the second actuator fiber 2d (even if the temperature of the first actuator fiber 2c and the temperature of the second actuator fiber 2d return to a room temperature).

Then, the temperature of the first actuator fiber 2c and the temperature of the second actuator fiber 2d are made the same as each other again as illustrated in FIG. 6(a). That is, the temperature of the first actuator fiber 2c is increased and the temperature of the second actuator fiber 2d is lowered, so that the first actuator fiber 2c and the second actuator fiber 2d have the same length. This shifts the plate member 6b to the unlocked state where the plate member 6b and the linking member 18a are unlocked from the frame member 8b.

As described above, in the actuator 1b according to the present embodiment, the plate member 6b is switched between the locked state and the unlocked state by changing the tilt of the plate member 6b and the linking member 18a by using a stretch/contraction operation of the first actuator fiber 2c and the second actuator fiber 2d and thereby locking or unlocking the plate member 6b and the linking member 18a to/from the frame member 8b. In a case where the actuator 1b is driven, the position can be freely displaced in the unlocked state, whereas in a case where the position displaced by driving is maintained, the load F can be held in the locked state. As a result, it is possible to make consumption of energy that is input to the actuator 1b low.

In the present embodiment, for convenience of description, the state of the plate member 6b illustrated in FIG. 6(a) is referred to as a horizontal state since the supporting points 15d, 15e, and 15f are aligned horizontally in FIG. 6(a), and the state of the plate member 6b illustrated in FIG. 6(b) is referred to as a tilted state. However, the present embodiment is not limited to this. It is only necessary that an angle of the plate member 6b with respect to the axis of the supporting point 15f that is perpendicular to the plane including the first actuator fiber 2c and the second actuator fiber 2d is changed in accordance with a difference in temperature between the first actuator fiber 2c and the second actuator fiber 2d, and the plate member 6b is switched between the locked state and the unlocked state in accordance with the change of the angle.

As described above, according to the present embodiment, the plate member 6b can be switched between the locked state and the unlocked state by causing the control unit 10b to adjust a difference in displacement between the first actuator fiber 2c and the second actuator fiber 2d while almost entirely constituting the actuator 1b by linear members. It is therefore possible to obtain the actuator 1b that can hold displacement with a flexible and simple configuration.

In the present embodiment, the first actuator fiber 2c and the second actuator fiber 2d that have the same spring shape and the same length are used. This allows the actuator fibers to have equal spring rates and react equally to input energy, thereby making it easy to handle the actuator 1b, and therefore this is desirable. However, the present embodiment is not limited to this. It is also possible to employ a configuration in which a spring rate of the first actuator fiber 2c is different from that of the second actuator fiber 2d. Even in a case where the spring rate of the first actuator fiber 2c is different from that of the second actuator fiber 2d, moments around the supporting point 15f that are caused by the first actuator fiber 2c and the second actuator fiber 2d when the plate member 6b is displaced can be balanced out by adjusting a distance between the supporting point 15f and the supporting point 15d and a distance between the supporting point 15f and the supporting point 15e in accordance with a ratio of the spring rates.

In the present embodiment, each of the first actuator fiber 2c and the second actuator fiber 2d is constituted by a single actuator fiber. However, the present embodiment is not limited to this. Each of the first actuator fiber 2c and the second actuator fiber 2d may be constituted by a plurality of actuator fibers.

Modification of Embodiment 2

Figure 7:
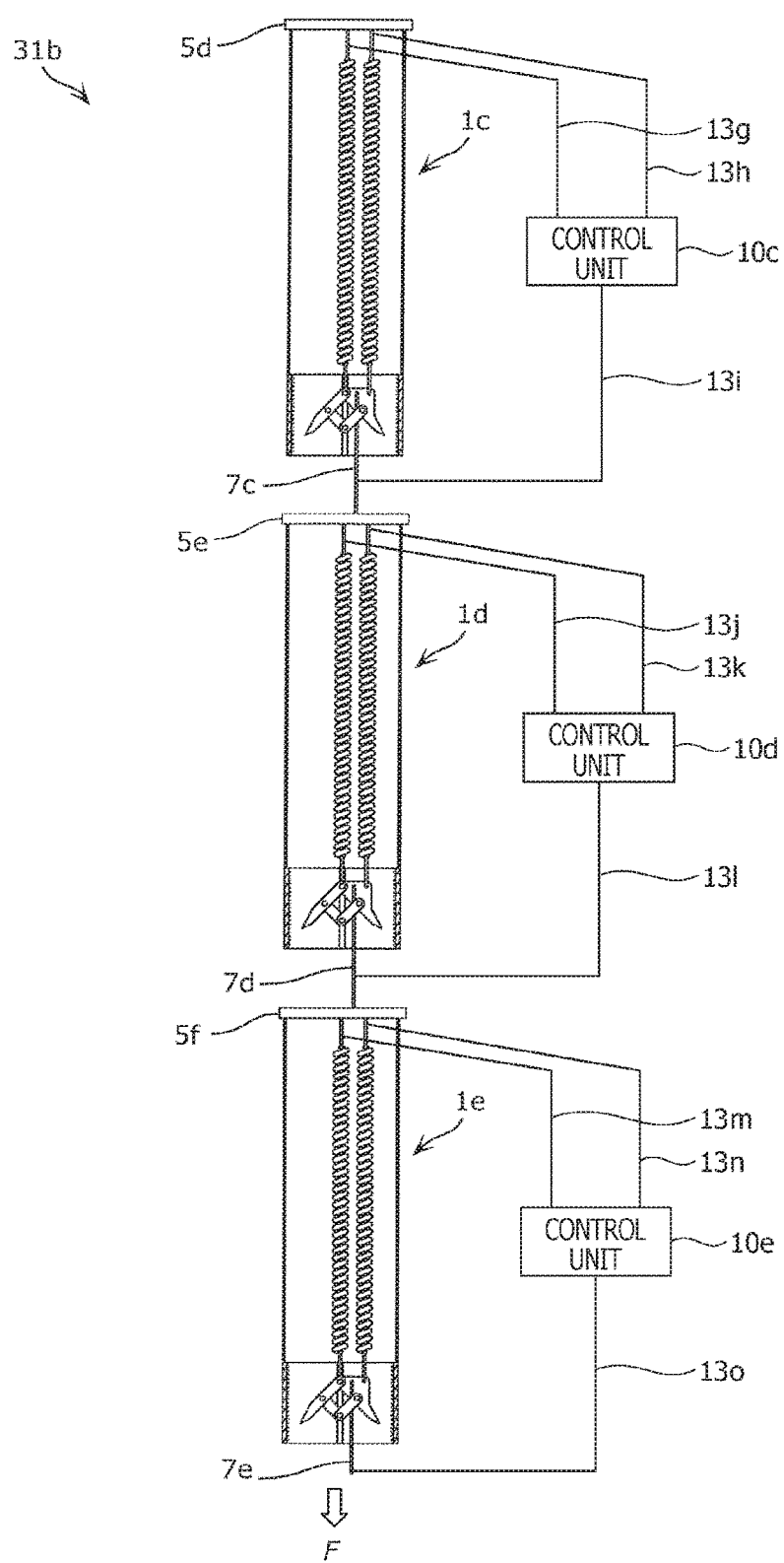
FIG. 7 is a diagram illustrating an actuator set in which actuators according to Embodiment 2 are disposed in series with each other.

FIG. 7 is a diagram illustrating an actuator set 31b according to a modification of Embodiment 2.

The actuator set 31b has a structure in which three actuators 1c, 1d, and 1e, each of which has the same configuration as the actuator 1b, are disposed in series with each other so that linear members and first plates thereof are connected to each other.

In the actuator set 31b, a linear member 7c of the actuator 1c and a plate member 5e of the actuator 1d are joined to each other, and a linear member 7d of the actuator 1d and a plate member 5f of the actuator 1e are joined to each other. Each of the plate members 5d, 5e, and 5f is an insulator. This electrically insulates wires 13i, 13j, and 13k from one another. Similarly, wires 13l, 13m, and 13n are also electrically insulated from one another. The actuator set 31b is configured so that load F acts on a linear member 7e of the actuator 1e in the downward direction of FIG. 7. The actuators 1c, 1d, and 1e are given electricity and driven independently of each other by respective control units 10c, 10d, and 10e. By fixing the plate member 5d of the actuator 1c at a predetermined position in this configuration, the actuator set 31b in which the actuators 1c, 1d, and 1e are displaced is obtained.

The actuator set 31b can hold load F while keeping energy consumption low as in the actuator 1b by shifting all of the actuators 1c, 1d, and 1e to the locked state. Furthermore, in a case where the actuators 1c and 1d are in the locked state, the actuator set 31b has the actuator 1e below a locked position. This makes it possible to hold the load F while achieving elasticity that is ⅓ of that of all of the actuators 1c, 1d, and 1e and keeping energy consumption low. Similarly, in a case where the actuator 1c is in the locked state, the actuator set 31b has the two actuators 1d and 1e below a locked position. This makes it possible to hold the load F while achieving elasticity that is ⅔ of that of all of the actuators 1c, 1d, and 1e and keeping energy consumption low. It is therefore possible to obtain the actuator set 31b that can hold the load F while keeping energy consumption low and switch elasticity in the locked state.

In this modification, the actuator set 31b is constituted by the three actuators 1c, 1d, and 1e. However, this modification is not limited to this. The actuator set 31b may be constituted by two or more any number of actuators.

In the present embodiment, the actuator fibers are made of nylon. However, the material of the actuator fibers is not limited to this. The actuator fibers can be made of any of various high polymer materials such as polyethylene, PVDF, polyester, or Kevlar.

In the present embodiment, the temperature of the actuator fibers is changed by silver-plating surfaces of the actuator fibers and electrically heating the actuator fibers. This method is easy to handle and is therefore desirable. However, the present embodiment is not limited to this. The actuator fibers may be electrically heated by plating the surfaces with an electrically conductive material other than silver, by making the actuator fibers electrically conductive by blending an electrically conductive material in the high polymer material, or by winding an electrically conductive material around the actuator fibers. Furthermore, the temperature of the actuator fibers may be changed, for example, by changing the temperature of gas around the actuator fibers or by changing the temperature of liquid that is in contact with the actuator fibers. In a case where the surfaces of the actuator fibers are made electrically conductive, the surfaces may be coated so as to be insulated in order to prevent electrical contact with an adjacent actuator fiber.

In the present embodiment, high polymer fibers are used as actuator fibers. However, the present embodiment is not limited to this. A fibrous shape-memory alloy that is wound spirally can also be used.

An actuator and an actuator set according to one or more aspects have been described above on the basis of the embodiments, but the present disclosure is not limited to the embodiments. Various modifications of the embodiments which a person skilled in the art can think of and combinations of the constituent elements in different embodiments may also be encompassed within the scope of the one or more aspects as long as such modifications and combinations are not deviated from the purpose of the present disclosure.

An actuator according to the present disclosure is applicable, for example, as an artificial muscle actuator for driving a machine that works close to a human. Furthermore, an actuator according to the present disclosure is applicable as a safe linear actuator that has flexibility against external force, a light-weight linear actuator, or a planar fabric actuator that can be bent.

What is claimed is:

1. An actuator comprising:
   one or more first actuator fibers that are connected to a first plate and a second plate via first connection members;
   one or more second actuator fibers that are connected to the first plate and the second plate via second connection members;
   a locking unit that is provided at a fixed distance from the first plate; and
   a controller configured to control temperature of the one or more first actuator fibers and temperature of the one or more second actuator fibers,
   wherein each of the one or more first actuator fibers and the one or more second actuator fibers is wound spirally and stretches or contracts when temperature thereof is changed, and
   wherein the controller is configured to lock the second plate to the locking unit by controlling a difference in temperature between the one or more first actuator fibers and the one or more second actuator fibers such that the second plate is positioned at a first angle that engages with the locking unit in response to a locking command and to unlock the second plate from the locking unit by controlling the difference in temperature between the one or more first actuator fibers and the one or more second actuator fibers such that the second plate is positioned at a second angle that disengages from the locking unit in response to an unlocking command.

2. The actuator according to claim 1, wherein each of the one or more first actuator fibers and the one or more second actuator fibers has a structure in which a high polymer fiber bundle including one or more twisted high polymer fibers is wound spirally.

3. The actuator according to claim 1, wherein each of the one or more first actuator fibers and the one or more second actuator fibers has a structure in which a fibrous shape-memory alloy is wound spirally.

4. The actuator according to claim 1, wherein the controller is configured to control the temperature of the one or more first actuator fibers and the temperature of the one or more second actuator fibers to be equal to each other in response to the locking command and to produce a predetermined difference in temperature between the one or more first actuator fibers and the one or more second actuator fibers in response to the unlocking command.

5. An actuator set comprising a plurality of actuators as set forth in claim 4 that are arranged in parallel with one another.

6. The actuator according to claim 1, wherein the controller is configured to produce a difference in temperature between the one or more first actuator fibers and the one or more second actuator fibers in response to the locking command and to control the temperature of the one or more first actuator fibers and the temperature of the one or more second actuator fibers to be equal to each other and increase the temperature of the one or more first actuator fibers and the temperature of the one or more second actuator fibers while keeping the temperature of the one or more first actuator fibers and the temperature of the one or more second actuator fibers equal to each other in response to the unlocking command.

7. An actuator set comprising a plurality of actuators as set forth in claim 6 that are arranged in series with one another.

8. The actuator according to claim 1, wherein
   a spring rate of each of the one or more first actuator fibers is equal to a spring rate of each of the one or more second actuator fibers.

9. The actuator according to claim 1, wherein
   a guide member that guides movement of the second plate when the second plate is locked or unlocked is provided on the locking unit.

10. The actuator according to claim 1, wherein the controller is configured to return the temperature of the one or more first actuator fibers and the temperature of the one or more second actuator fibers to a room temperature in a state where the temperature of the one or more first actuator fibers and the temperature of the one or more second actuator fibers have been increased and the second plate has been locked.

11. A contraction belt comprising:
    the actuator as set forth in claim 1,
    the first plate and the second plate of the actuator and an elastic fiber being connected so as to form a ring.

* * * * *